US010019720B2

(12) United States Patent
Messer

(10) Patent No.: US 10,019,720 B2
(45) Date of Patent: Jul. 10, 2018

(54) CLIENT-SIDE DYNAMIC PAGE FEED MANAGEMENT

(71) Applicant: Transitiv, Inc., Atlanta, GA (US)

(72) Inventor: Stephen Ashley Messer, Atlanta, GA (US)

(73) Assignee: Transitiv, Inc., Atlanta, GA (US)

( * ) Notice: Subject to any disclaimer, the term of this patent is extended or adjusted under 35 U.S.C. 154(b) by 0 days.

(21) Appl. No.: 15/431,229

(22) Filed: Feb. 13, 2017

(65) Prior Publication Data

US 2018/0096391 A1    Apr. 5, 2018

Related U.S. Application Data

(62) Division of application No. 15/282,604, filed on Sep. 30, 2016.

(51) Int. Cl.
G06Q 30/02    (2012.01)
G06Q 10/08    (2012.01)
G06F 17/30    (2006.01)

(52) U.S. Cl.
CPC ......... *G06Q 30/02* (2013.01); *G06F 17/3089* (2013.01); *G06Q 10/08* (2013.01); *G06Q 30/0201* (2013.01); *G06Q 30/0255* (2013.01); *G06Q 30/0277* (2013.01)

(58) Field of Classification Search
CPC ............... G06Q 30/02; G06Q 30/0201; G06Q 30/0225; G06Q 30/0227; G06Q 10/08; G06F 17/3089
See application file for complete search history.

(56) References Cited

U.S. PATENT DOCUMENTS

| 5,706,365 | A | 1/1998 | Rangarajan et al. |
| 6,912,505 | B2 | 6/2005 | Linden et al. |
| 7,685,074 | B2 | 3/2010 | Linden et al. |
| 7,870,038 | B1* | 1/2011 | Hammond ............. G06Q 10/06 705/26.1 |
| 8,065,410 | B1* | 11/2011 | Breen .................. H04L 67/025 702/182 |
| 8,401,924 | B1 | 3/2013 | Rajyaguru et al. |
| 8,935,243 | B2* | 1/2015 | Marshall ................ G06Q 30/02 705/14.4 |
| 9,317,612 | B1 | 4/2016 | Camplejohn et al. |
| 2002/0107855 | A1 | 8/2002 | Nishi |
| 2003/0107575 | A1 | 6/2003 | Cardno |
| 2008/0189267 | A1* | 8/2008 | Spivack ............. G06F 17/2247 |
| 2009/0234711 | A1 | 9/2009 | Ramer et al. |
| 2010/0082780 | A1 | 4/2010 | Muilenburg et al. |

(Continued)

OTHER PUBLICATIONS

Office Action from related U.S. Appl. No. 15/282,604 dated May 17, 2017.

*Primary Examiner* — Asfand M Sheikh
(74) *Attorney, Agent, or Firm* — Troutman Sanders LLP; Alexis N. Simpson; Brennan M. Carmody

(57) ABSTRACT

Disclosed herein are systems, methods, and apparatuses that can provide, for example, dynamic page feed recognition for providing zero-configuration analysis of web pages and tailored advertisement provision to website visitors. The systems, methods, and apparatuses can be used to analyze inventory feed. Based on analysis of user interaction data on the web pages, one or more matching methodologies can be used to determine matching data between the visited web pages and the inventory feed.

12 Claims, 6 Drawing Sheets

(56) References Cited

U.S. PATENT DOCUMENTS

2013/0006764 A1 1/2013 Zhang
2013/0018903 A1* 1/2013 Taranov ............ G06F 17/30318
                                                          707/756

* cited by examiner

CLIENT-SIDE DYNAMIC PAGE FEED MANAGEMENT

CROSS-REFERENCE TO RELATED APPLICATIONS

This application is a divisional of, and claims priority under 35 U.S.C. § 121 to, U.S. patent application Ser. No. 15/282,604, filed Sep. 30, 2016, titled "Systems, Methods, and Devices for Dynamic Page Feed Management," the contents of which are incorporated herein by reference in their entirety.

BACKGROUND

Through technology, improved advertising can be personalized and targeted to the particular viewer of a website. However, interest-based advertising requires the coordination of many systems before a merchant can advertise on a publisher's website.

Often, a merchant, i.e., an advertiser, will use an advertising (ad) agency to manage its advertising and a website developer to create and maintain its website. An ad agency typically uses a demand-side platform (DSP), which is a system that allows the ad agency to manage buying advertising space from multiple sources (such as ad exchanges), direct publisher relationships, and integrate data from data brokers through one interface. However, for the DSP to function properly, the website developer may often need to modify the merchant's website. Integration on the merchant's website can allow the DSP to track "conversions" (shoppers who click on advertisements), which can provide insight into an ad campaign's effectiveness. Advertiser website integration can also allow the DSP to build audiences that can be used in the DSP's bidder to buy media on many different publishers.

Additionally, the DSP's bidder can be set to only bid for ad space when the consumer matches an audience list collected from the advertiser's website. Buying based on an audience list collected from the advertiser's website can be referred to as retargeting or dynamic remarketing. Through remarketing, the advertiser can try to re-engage an audience that already visited their website.

Ad exchanges, and other types of demand/supply intermediaries, are technology platforms that facilitate the buying and selling of advertising from multiple DSPs, ad networks, and advertisers. Additionally, data aggregators use data management platforms (DMPs) to provide the ability to bring in audience list/segments from third-party sources that are not from the advertiser. Data aggregators are companies that gather data from multiple sources to build audience segments/lists based on interests (e.g., frequent travelers).

Ad networks are organizations that aggregate available ad space from web site publishers. The website publishers use a supply side platform (SSP), which is a technology platform that provides outsourced media selling and ad exchange/network management services for publishers. For each system to work with the other systems in the advertising chain, various conventions must be followed, which can require the allocation of vast resources. Further, to remain relevant, constantly updating the advertisements can be needed. Existing approaches can be brittle and/or slow to implement.

Many current systems can be brittle such that, while it can be possible to get dynamic remarketing working on a site initially, the dynamic remarketing can break when the advertising script placement or syntax is modified. Similarly, the remarketing strategies can break when the script remains in place and functioning, but values are not updated to reflect new or changed inventory being sold through a merchant's website. Whenever inventory changes, the DSP can require specific values that classify the inventory to be manually input into the merchant's website. Decreased advertising campaign performance is typically the only indication that the values going into the script are invalid.

There are continuing efforts to improve interest-based advertising technology.

BRIEF DESCRIPTION OF THE FIGURES

The accompanying drawings illustrate one or more embodiments and/or aspects of the disclosure and, together with the written description, serve to explain the principles of the disclosure. Wherever practicable, like reference numbers are used throughout the drawings to refer to the same or like elements of an embodiment, and wherein.

DETAILED DESCRIPTION

Figure 1:
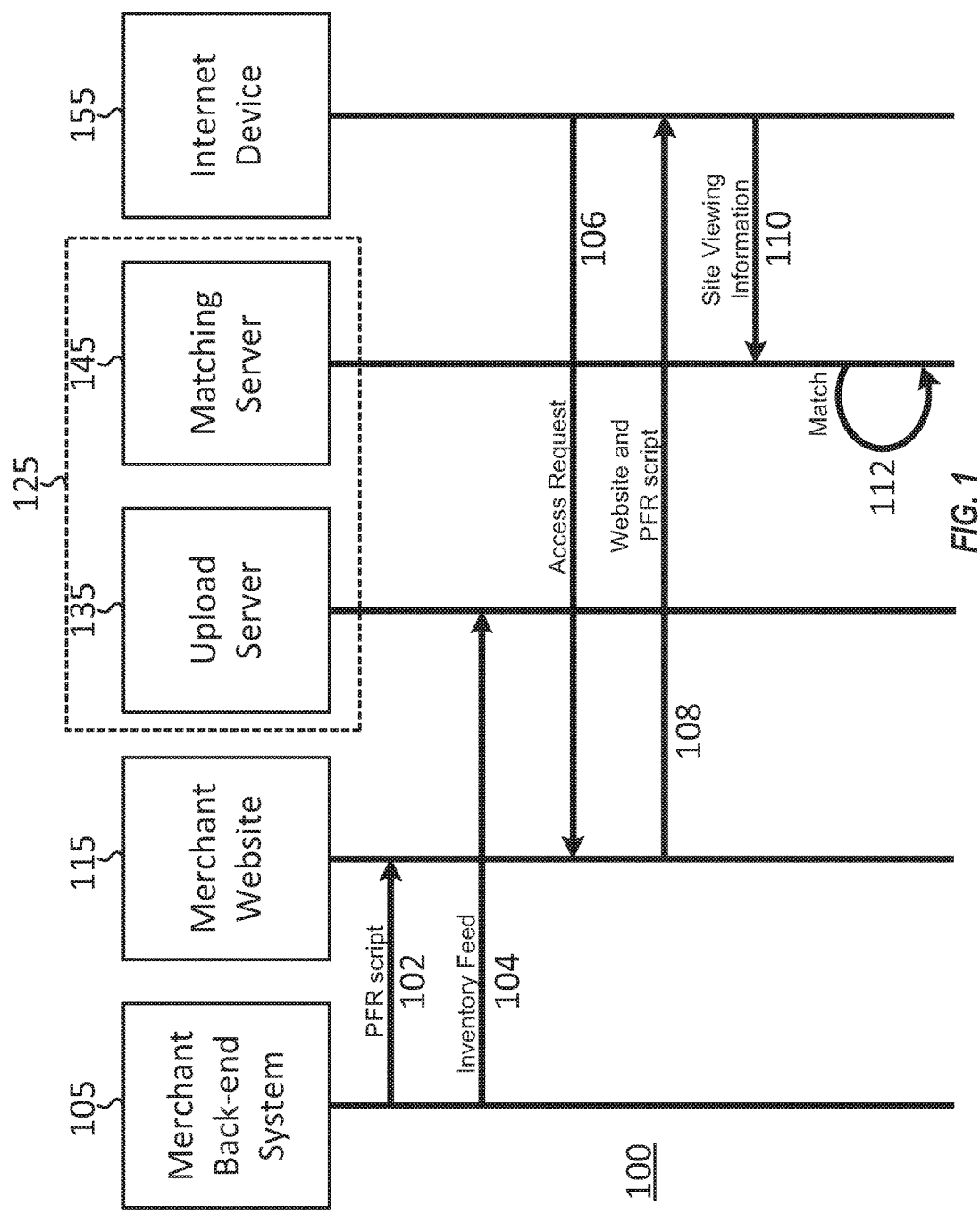
FIG. 1 is a process flow diagram of a method for determining viewed inventory according to an embodiment.

In some aspects, the disclosed technology relates to analysis and efficient processing of website structure for the determination of appropriate, tailored content related to websites. In some example implementations, systems, methods, and apparatuses can analyze e-commerce web pages and determine the inventory items each individual website visitor is exposed to while that person is browsing a merchant's website.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. By "comprising" or "containing" or "including" or "having" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method can be performed in a different order than those described herein without departing from the scope of the present disclosure. Similarly, it is also to be understood that the mention of one or more components in a device or system does not preclude the presence of additional components or intervening components between those components expressly identified.

Zero-Configuration after Install

FIG. 1 is a process flow diagram of a method 100 for determining viewed inventory according to an embodiment. The term "inventory" includes all products and services displayed on a merchant's website, regardless of whether the merchant maintains physical stock of the inventory item. The method 100 can be used to provide tailored advertisement to website visitors. The method 100 can be performed by one or more computing devices. Examples of computing devices include, but are not limited to, server machines, Internet devices, and combinations thereof. Examples of server machines include, but are not limited to, dedicated machines and cloud-based services. Examples of Internet devices include, but are not limited to, mobile phones, tablets, computers, televisions, PC cards, mobile hotspots, portable purchasing devices (e.g., AMAZON DASH®), user-interactive purchasing devices (e.g., AMAZON ECHO®), home appliances, vehicles, and combinations thereof.

According to some embodiments, the method 100 can be a "zero-configuration" method 100. Zero-configuration means that once the required code/script (e.g., JAVASCRIPT®) is placed on one or more relevant pages of a website, the website does not need to be further modified or configured, even as the merchant makes changes to inventory or updates the website, provided the code remains somewhere on the page. In other words, products and services listed for sale on a merchant's web page do not need to be specifically designated as such, for example, using html or another web page designation.

Referring to an embodiment of FIG. 1, a merchant website 115 is modified 102 using a back-end system 105 to include a page feed recognition (PFR) script instructions or a reference to the location of the PFR script's instructions on a relevant web page. For example, in some embodiments, the PFR script is included by placing the entire PFR script instruction set on every page of the merchant's website 115 that the merchant wants to be included in its remarketing efforts. In some other embodiments, the PFR script is included by placing a reference to the location of the PFR script's instructions on relevant web pages as, for example, with an html script tag.

An inventory feed is uploaded 104 using the back-end system 105 to the upload server 135. In some embodiments, the upload server 135 can be part of a PFR system 125 along with a matching server 145. In some embodiments, the upload server 135 performs some analysis or manipulation of the inventory feed, some non-limiting examples of which are described in more detail below with reference to FIG. 2.

Referring back to FIG. 1, a consumer can use an Internet device 155 to request access 106 to the merchant website 115.

The merchant website 115 provides 108 the merchant's web pages along with the embedded or referenced PFR script to the Internet device 155.

The PFR script causes the matching server 145 to be notified 110 that a user is visiting a specific web page of the merchant's website 115. In some embodiments, the user is identified by an anonymous ID on the Internet device 155. In some embodiments, the PFR script causes the Internet device 155 to notify 110 the matching server 145 that a specific web page, which can be identified with a URL, is being visited. The URL can be identified, for example, by accessing the location.href object, by accessing the referrer HTTP header request from a user's browser, or by proxy. The notification, according to some embodiments, is described in further detail below with reference to FIGS. 3 and 4.

The matching server 145 may then match 112 the items, for example items offered for sale, on the web page visited by the user to items from the inventory feed. Matching, according to some embodiments, will be described in greater detail below.

Page-Feed Upload

Figure 2:
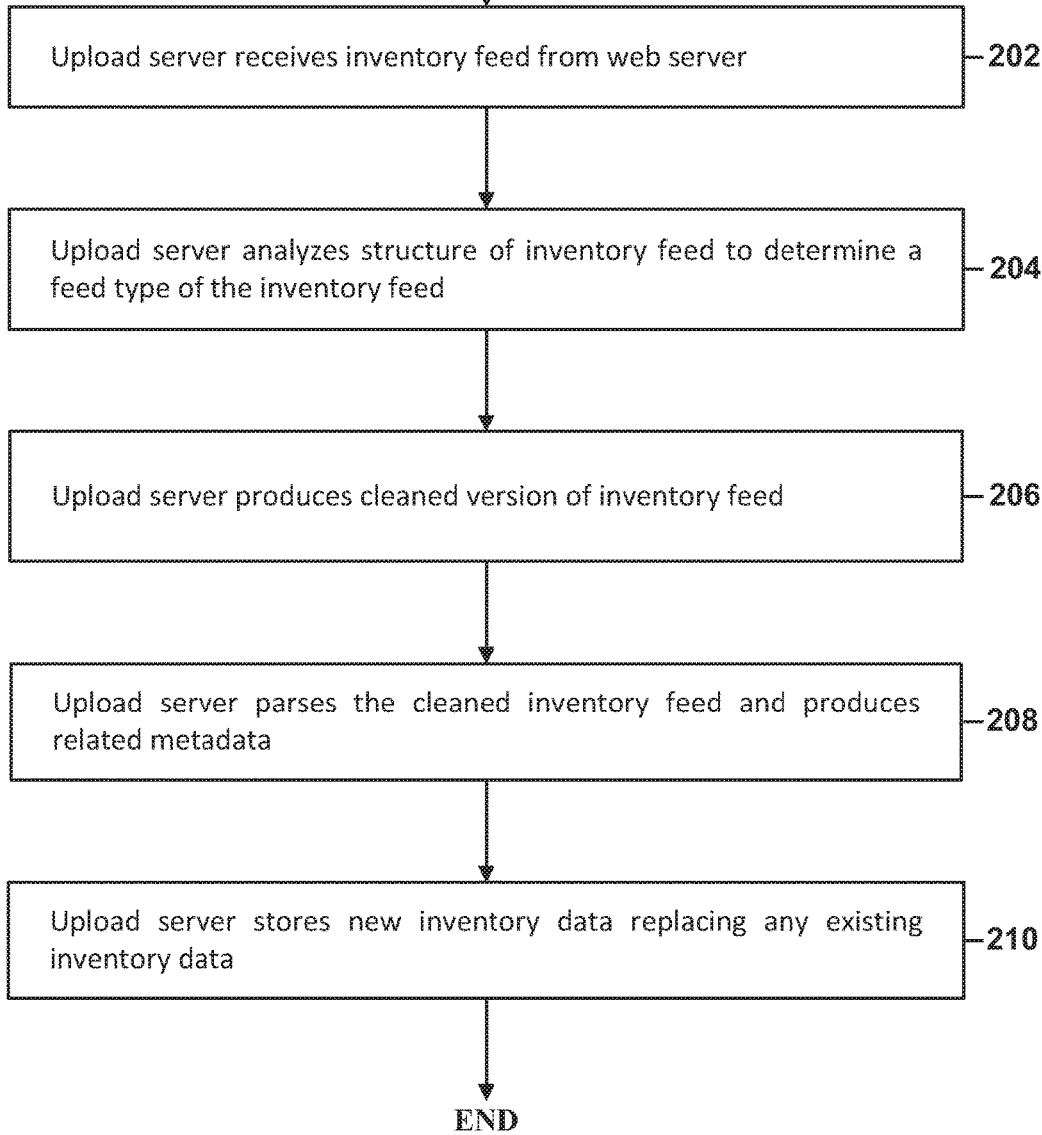
FIG. 2 is a flowchart showing a method of inventory data compilation for page-feed recognition according to an embodiment.

FIG. 2 is a flowchart showing a page-feed upload method 200 according to some embodiments. The method 200 can be performed by one or more computing devices, including one or more server machines. According to some embodiments, one or more matching server machines 145 receive 202 an inventory feed from a merchant's back end system 105.

In certain embodiments, the inventory feed can be in whatever format is convenient for the merchant (e.g., formats already being used by the merchant for its other systems). Examples of the feed include, but are not limited to, a flat database with rows representing inventory items and columns representation features of the inventory item (e.g., stock number, SKU number, textual description, price, size, color, weight, or a combination thereof), or a JavaScript Object Notation (JSON) structure with keys and values describing the inventory. Each inventory item can have many fields of data (e.g., database columns or JSON objects) associated with it. Although many of the inventory fields may be irrelevant to the system 125, in some embodiments, the system 125 only attempts to match relevant fields to website data.

In some cases, not all inventory feeds will have a same structure. For example, two feeds from two different websites using a same e-commerce platform can have some overlapping columns, as well as some columns that do not overlap. Thus, in some embodiments, the system 125 can analyze 204 structure of the feed to see if it has processed this type of feed before. This can occur because, if the system 125 knows the feed type, it will know where in the inventory feed to look for relevant information. The feed type mechanism can be helpful for standardizing each website's feed so irrelevant data can be ignored. Each feed type may be associated with a list of relevant fields (e.g., columns in flat data files or objects in JSON structures) so the system 125 can quickly match inventory feeds to nodes acquired from websites 115, as is described more fully with reference to FIG. 2. A field might be determined to be irrelevant because it contains repetitive data (e.g., common to other fields for the same inventory item, or common to all inventory items), or internal data that would typically not be publicly displayed on an e-commerce website 115.

The system 125 may scan metadata (e.g., column labels in flat files or keys in JSON structures) of the inventory feed. If the system 125 determines, based on scanning the metadata, that all of the required fields for a particular feed type are present, the system 125 can classify the feed associated with the metadata as the particular type of feed. If the system 125 determines that there are multiple possible feed types that match the uploaded feed, then the system 125 can choose the feed type with the most matching fields (i.e., including both relevant and irrelevant fields). If the system 125 still cannot resolve the feed type, it can request that the inventory feed uploader select from among possible feed types during the feed upload process or create a new feed type. Automatic feed type recognition is an optimization, and may not be necessary in certain embodiments, including but not limited to embodiments where the inventory feed must conform to a particular feed structure.

If a particular feed type is used, then the particular feed type name could be appended to the feed data as its own field. A separate library of feed types could then be used to identify relevant fields for each unique feed type. As refinements are made and new fields are determined to be relevant or irrelevant, the feed type library could be updated, providing a mechanism for making easy global changes.

In some embodiments, the feed type library additionally includes information for constructing destination URLs for use in advertisements. For example, if a shopper views a particular inventory item at a particular website URL, then that particular website URL may be a better place to send the shopper from an advertisement than a homepage of the merchant's website 115, which may not display information about the specific inventory item. If a user clicks on an advertisement, landing that user on a web page for the specific inventory item can boost the performance of the advertising programs built from the match data. According to some embodiments, URLs might be constructed based on the system's 125 knowledge of the website 115 supplied, for example, by the merchant during an account set-up with the system 125. For example, for those websites 115 with search capabilities, sophisticated URLs might be constructed from information in the feed type library that corresponds to a search results page including only inventory items viewed by the user. Alternatively, appropriate landing pages might include specific product pages containing a single inventory item or a category page with multiple similar inventory items.

In some embodiments, the upload server 135 cleans 206 the received inventory feed to yield a cleaned version of a feed. The cleaning can include, but is not limited to, the process of removing non-word characters and punctuation from each feed field. The cleaning might also include, but is not limited to, standardizing abbreviations and/or synonyms so that words with the same meaning return the same result (e.g., replacing "Extra Large" and "X-Lrg" with "XL"). By performing the same cleaning algorithms on website data (see below with reference to FIG. 3), cleaning can increase the probability that a matching system 125 will perform consistently, regardless of variations between website content and an inventory feed.

According to some embodiments, the cleaning is performed on just the relevant fields. According to some other embodiments, the cleaning is performed on all fields, which may allow changes to a feed type library to take place immediately.

The system 125 parses 208 the feed data and produces related metadata. Related metadata can include, for example, inventory groupings (e.g., categories such as electronics, books, furniture, etc.), keying (so the system 125 can quickly refer to a particular inventory item), and URL building (to be used in conjunction with the global URL data in the feed type library). Additionally, calculations necessary for a matching algorithm can also be performed on the inventory feed (e.g., building an n-gram library, as described in connection with the natural language algorithm below).

The new inventory data can be stored 210, replacing any prior inventory data so non-current inventory data would not be used to perform matches. The new inventory data can be stored in the matching server 145 and can be available for serving/matching requests. According to some embodiments, the new inventory data can include the original inventory feed with its original metadata and the cleaned inventory feed with any new fields, such as those for feed type, grouping, keying, matching, and URL building. According to some embodiments, only the cleaned inventory feed with any new fields are stored for matching.

Page-Feed Recognition

Figure 3:
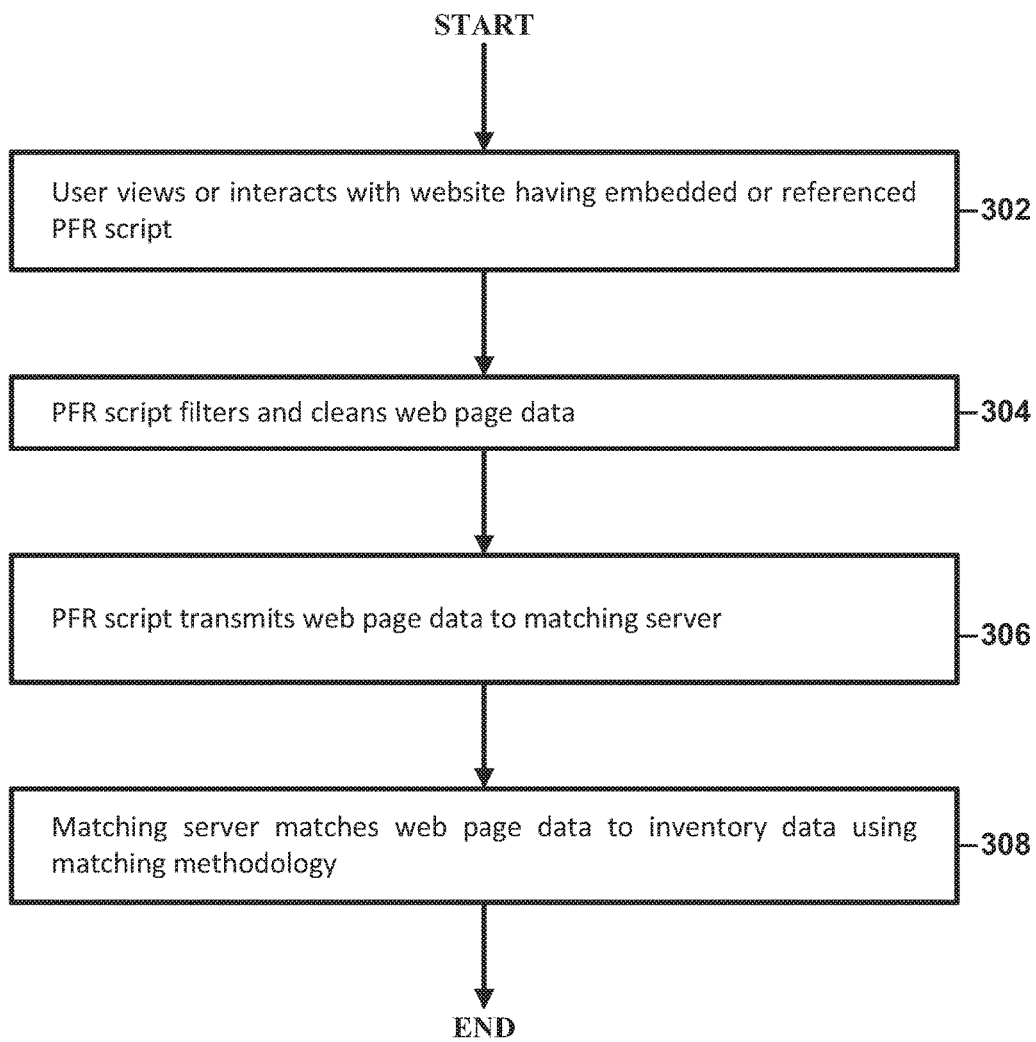
FIG. 3 is a flowchart showing a method of page-feed matching according to an embodiment.

FIG. 3 is a flowchart 300 showing a method of page-feed matching according to some embodiments. The method can be performed by one or more computing devices, including but not limited to one or more server machines, and including a matching server 145. The upload server 135 and matching server 145 may or may not be the same server machine(s) within the system 125.

In some embodiments, a user views and interacts 302 with the website 115. The interaction can include, for example, clicking on certain items on a web page, zooming, hovering a cursor over certain items, highlighting certain text, and other browsing activities.

In some embodiments, the PFR script can filter out 304 html tags or other page elements that are not typically associated with layout content from the web page data. By doing this, the communication between the Internet device 155 and the matching server 145 can include smaller amounts of data and can coalesce text into longer continuous chains. For example, in the following html code: "<p> this is a fantastic <strong>14" Chromebook</strong> with a bold HD BrightView display </p>" can be sent to the matching server 145 with the <strong> tag and the " (quotation mark) tag removed, but including the word "bold" (which, when surrounded by angle brackets, is also an html tag) leaving the system 125 with an easier-to-match string of text (i.e., "this is a fantastic 14 Chromebook with a bold HD BrightView display") linked to the html node "<p>". This can make it easier to match the web page data to a feed item with similar text on the matching server 145. Nodes are often separated by html tags in separate html containers. In some embodiments, the PFR script also cleans 304 the node. The cleaning can include, for example, the same processes that were described in connection with the inventory feed cleaning in step 206 of FIG. 2, namely removing non-word characters and punctuation and standardizing abbreviations and/or synonyms. In some embodiments, the matching server 145 may perform filtering and/or cleaning of the web page data instead of or in addition to the PFR script.

In some embodiments, the PFR script causes the Internet device 155 to transmit 306 the web page data (either filtered or unfiltered and cleaned or uncleaned) to the matching server 145. In certain embodiments, the PFR script could also transmit user information, and website information to the matching server 145.

Those skilled in the art will recognize that multiple approaches of transmitting the web page data are possible. As previously described, the Internet device 155 could send the web page data (with or without filtering and cleaning) to the matching server 145. Alternatively, the PFR script could transmit information that triggers a direct page request from the merchant's website 115 so that the matching server 145 receives the web page data directly from the website 115 and creates a representation of the Internet device's 155 browsing experience.

After receiving the web page data, the matching server 145 matches inventory data (e.g., information collected in the processes described with reference to FIG. 2) to the data collected from the web page. According to some embodiments, the matching may be performed asynchronously. According to some embodiments, the matching may be performed in near real-time. According to some embodiments, the process to find matching data can take less than a second. Several different matching methodologies can be employed by the system 125. Examples of matching methodologies are discussed in greater detail below.

After the page feed recognition is complete (i.e., after the matching server 145 identifies inventory items on the merchant's web page by matching nodes against the inventory feed), the matching data may be output in various forms. For example, the output could include a four-tuple including an AnonymousId (e.g., cookie, deviceid, hash, or other end-user identification techniques), a DateTimeKey, a FeedItemKey, and a URL. Various ways of capturing the data and identifying information are envisioned. For example, if outputs are batched in time-stamped containers, the DateTimeKey could be superfluous. Also, a UserInterest score might be included that quantifies user behavior, such as a user visiting an individual inventory item's web page, staying on a web page for a long period of time, zooming in on a picture, highlighting text, or interacting with website features (e.g., share item with a friend, place item in checkout, leave a comment, etc.). In some examples, the matching data may be used to create user-specific retargeting advertisements.

Figure 4:
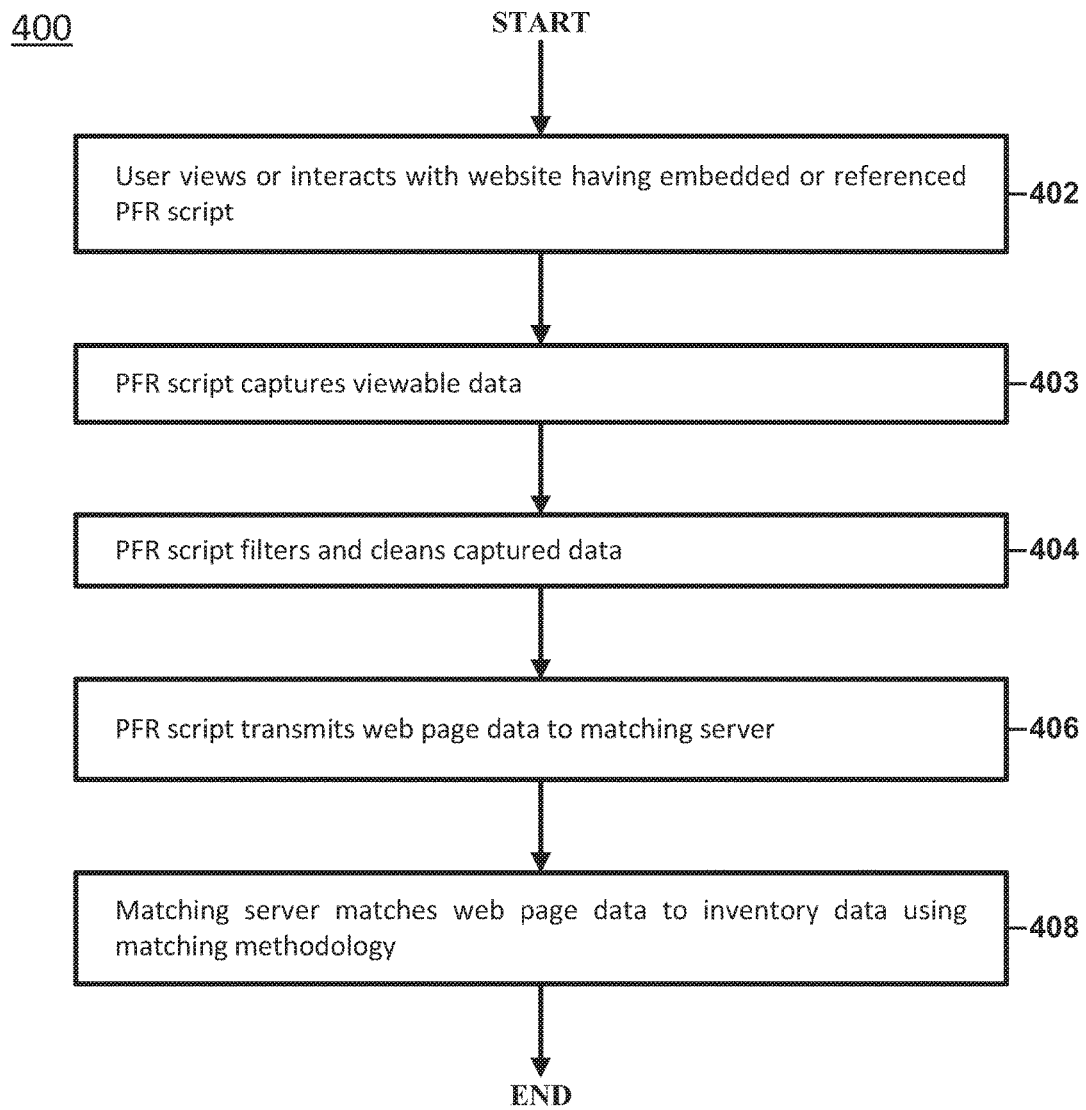
FIG. 4 is a flowchart showing a method of page-feed matching according to an embodiment.

FIG. 4 is a flowchart 400 showing a method of page-feed matching according to an embodiment. The method can be performed by one or more computing devices, including one or more server machines, including a matching server 145.

A user views and interacts 402 with a website 115 that includes the PFR script (i.e., the script instructions are embedded or referenced by the website 115). The user interaction may be substantially similar to that described above with reference to FIG. 3.

The PFR script captures 403 data that can be viewable by the user. The PFR script can detect which nodes are in view using viewport commands that many browsers make available. By capturing the viewport data, the system 125 may analyze only the visible items on a web page while ignoring items that the consumer never saw (e.g., those items at the bottom of the web page if the consumer never scrolled all the way down to the bottom of the web page). Accordingly, the PFR script can provide more precise behavioral advertising.

According to some embodiments, the PFR script can filter and clean 404 the captured data. The filtering and cleaning can be substantially similar to that described above with reference FIG. 3.

The PFR script transmits 406 the captured data (either filtered or non-filtered and cleaned or uncleaned) to a matching server 145 to analyze for inventory matches. In certain embodiments, the PFR script could also transmit user information, and website information.

Other approaches can be used. For example, the PFR script could trigger a custom page request from the merchant's website 115 to create a representation of the Internet device's 155 browsing experience on the matching server 145. In such an embodiment the system 125 could still restrict its analysis to the viewable area of the website by having the Internet device 155 transmit viewport or other interaction data to the matching server 145. The matching server 145 constructs the viewable nodes according to the application of the user's viewport and/or interaction data to the matching server's 145 representation of the web page that was received directly from the website 115.

The matching server 145 matches 408 of the inventory data using a matching methodology. The matching may be substantially similar to that described above with reference to FIG. 3. Several different matching methodologies can be employed by the system 125. Examples of methodologies include, but are not limited to, those discussed below.

Geometric Match—

The Internet device 155 can additionally transmit coordinates (e.g., the X-Y location along with width and height of the rectangle representing the node's geometric position). Next the system 125 can find all of the matching feed items where there can be text matching between the cleaned node input and the cleaned feed input. This can produce a large list of potential matches from the feed for a given input node. The system 125 can repeat the process for all of the nodes in the input, which yields a map (a data structure of nodes to potential feed items). The map can then be inverted so that the individual feed items are mapped to the nodes that they matched from. Any feed items linked to a single node can be marked as matches. Any nodes that are not linked to a feed item can be removed from consideration.

What remains in the map are nodes that match to multiple feed items. Often, the reason a feed item will match multiple nodes is because either a large portion of the web page is devoted to a single item or there are multiple items with similar names in the feed (e.g., "craftsman shovel brown," "craftsman shovel red," and "craftsman shovel green" feed items would all match a node with text "craftsman shovel"). Although the system 125 might initially treat the various nodes as potentially relating to different feed items, a collection of nodes might all relate to a single feed item. For each feed item remaining in the map the system 125 can then compute the dimensions of a set of rectangles where each rectangle circumscribes all of the remaining nodes that refer to that feed item.

Like a jigsaw puzzle, the various feed item rectangles are then geometrically combined to determine the best fit. For each of these combinations the system 125 computes the total area overlap of the various feed item bounding rectangles. The feed item combination that uses the most feed items while having an acceptable total area overlap ("alpha") of bounding rectangles are identified as matches. Alpha can be expressed as a percentage and could be set to any appropriate threshold, such as 51%. As an example, if there are 5 feed item rectangles, but the calculated alpha is too large (above the threshold) when all 5 feed items are used, then the system 125 will calculate alphas for all of the combinations that use only 4 feed items. If multiple feed item combinations result in acceptable alphas, then the 4 feed item combination with the lowest alpha is used. If no combination of 4 feed items results in an acceptable alpha, then alphas for all the combinations of 3 feed items are calculated. If every possible combination results in an unacceptable alpha, the system 125 can return a no match, or match the feed item with the smallest total area.

Exact Match—

In this methodology, an exact match can be required, whereby a cleaned node text must exactly match cleaned fields from the feed to be recognized. However, slight inconsistencies between the inventory feed and the website data could cause ambiguous matches or no matches at all.

Near Match Heuristic—

Each word from a given input node can be treated as a token. The system 125 can find cleaned feed items where there is a field that starts with the first token, followed by the second token, and so on until through all tokens from the input node (or all tokens for the field in the feed). Matches where there are less than a set number of tokens in the input node can be ignored (e.g., the system 125 can be set to ignore nodes of 3-words or less). Those skilled in the art will recognize that the match rate could improve by further cleaning the tokens Natural Language Processing—

This methodology is a refinement of the near match heuristic. The system 125 treats the relevant feed fields (i.e., fields that are listed in the feed type library for the feed type) as a corpus and determines a probability table from that corpus. Specifically, the first token from each feed field is associated with a frequency of occurrence, then the first two tokens, then the first three tokens, until a threshold is reached. For example, if there are 20 inventory items that have fields that start with the word "brown," then there is a 5% chance of picking he correct inventory item from a single "brown" token. However, if there are only 5 inventory items that have the token "brown" followed by the token "pitch" in one of the relevant inventory fields then there is 20% chance of those two tokens in sequence identifying the correct inventory item. If the three tokens "brown" "pitch" "fork" identify a single inventory item, then there is a 100% chance that those three tokens identify the inventory item. In that case, the corpus probability table does not have to go beyond those three tokens in a field that includes the sequence "brown pitch fork." The method can be further refined by counting each field separately in the probability calculations. For example, if the "brown pitch fork" sequence appears 9 times in various fields of the "Craftsman Standard Pitch Fork" inventory item, but only appears in a single field of the "American Gothic Lithograph by Grant Wood," there is a 90% likelihood that "brown pitch fork" identifies the Craftsman Pitch Fork inventory item. The system 125 could set a threshold (e.g., 90%) as the cutoff when determining whether to stop checking inventory field tokens. The resulting "n-gram library" of feed field tokens that have a high probability of pointing to an inventory field items can be used against input nodes to find matches. Those skilled in the art will recognize this method as being able to be accomplished through direct calculation or with n-grams.

Computer System Architecture

Figure 5:
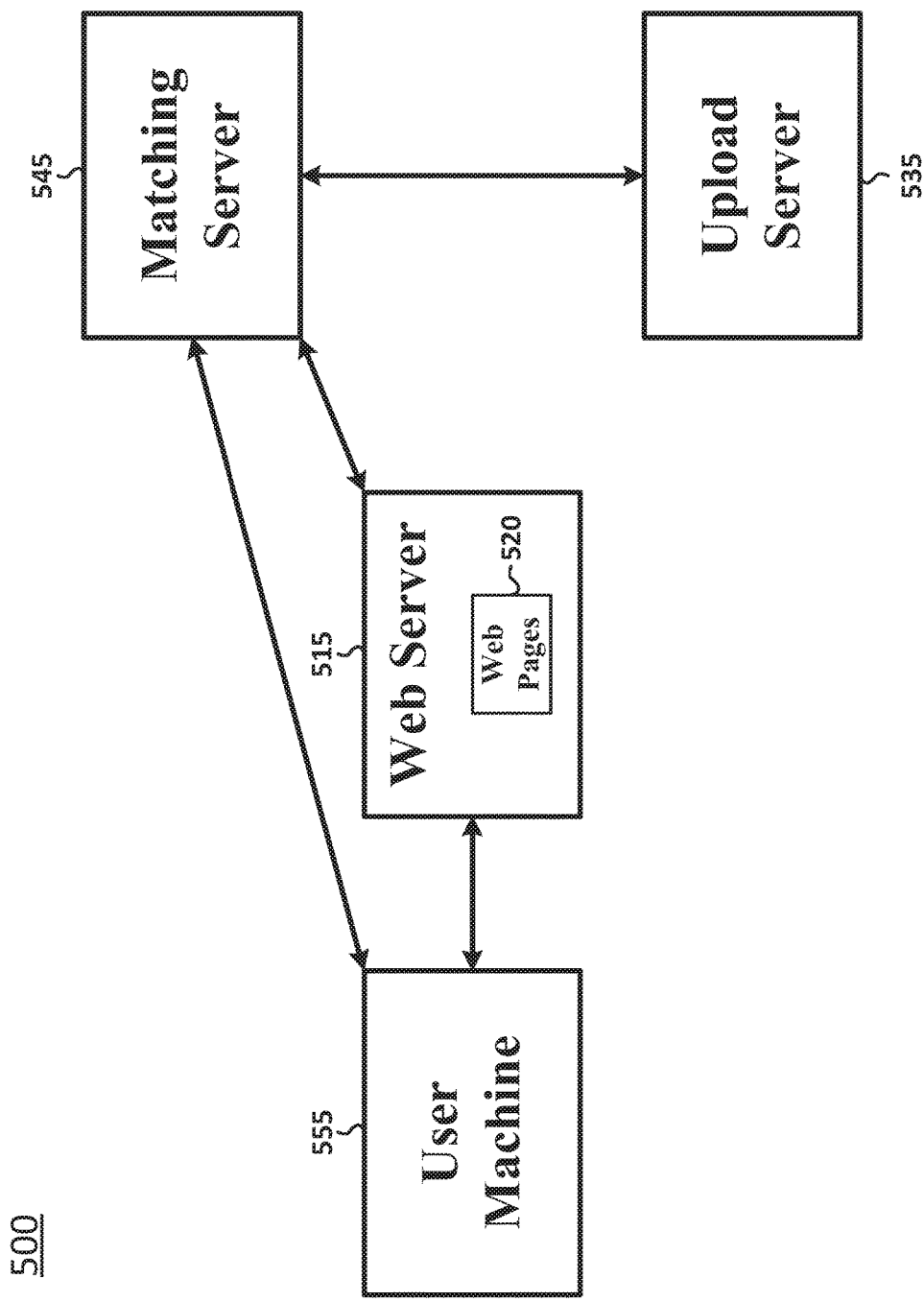
FIG. 5 is schematic diagram of a system for page-feed recognition according to an embodiment.

FIG. 5 is a schematic diagram of the architecture of system 500 for page-feed recognition according to some embodiments. Embodiments can collect and analyze data from one or more web pages.

Web server 514 can host one or more web pages 520, and can be the interface for sending data to and from the web pages 520. Upload server 535 can be used for inventory uploading, for example, as described above with reference to FIG. 2. User machine 555 can visit the web pages 520 via the web server 514 serving the web pages 520 to a web browser on the user machine 555. The matching server 545 can receive abbreviated viewport web page data and then process the web page data to determine the inventory items viewable on the user machine 555. The matching server 545 may receive the web page data directly from the user machine 555 or from the web server 514. Activity data on the activities of a user using the user machine 555 can also be transmitted to the matching server 545. Based on the activity data, the matching server 545 can emphasize the interest in some matched inventory items and de-emphasize other matched inventory items. Note that upload server 535 and matching server 545 can be a single server or multiple servers.

Figure 6:
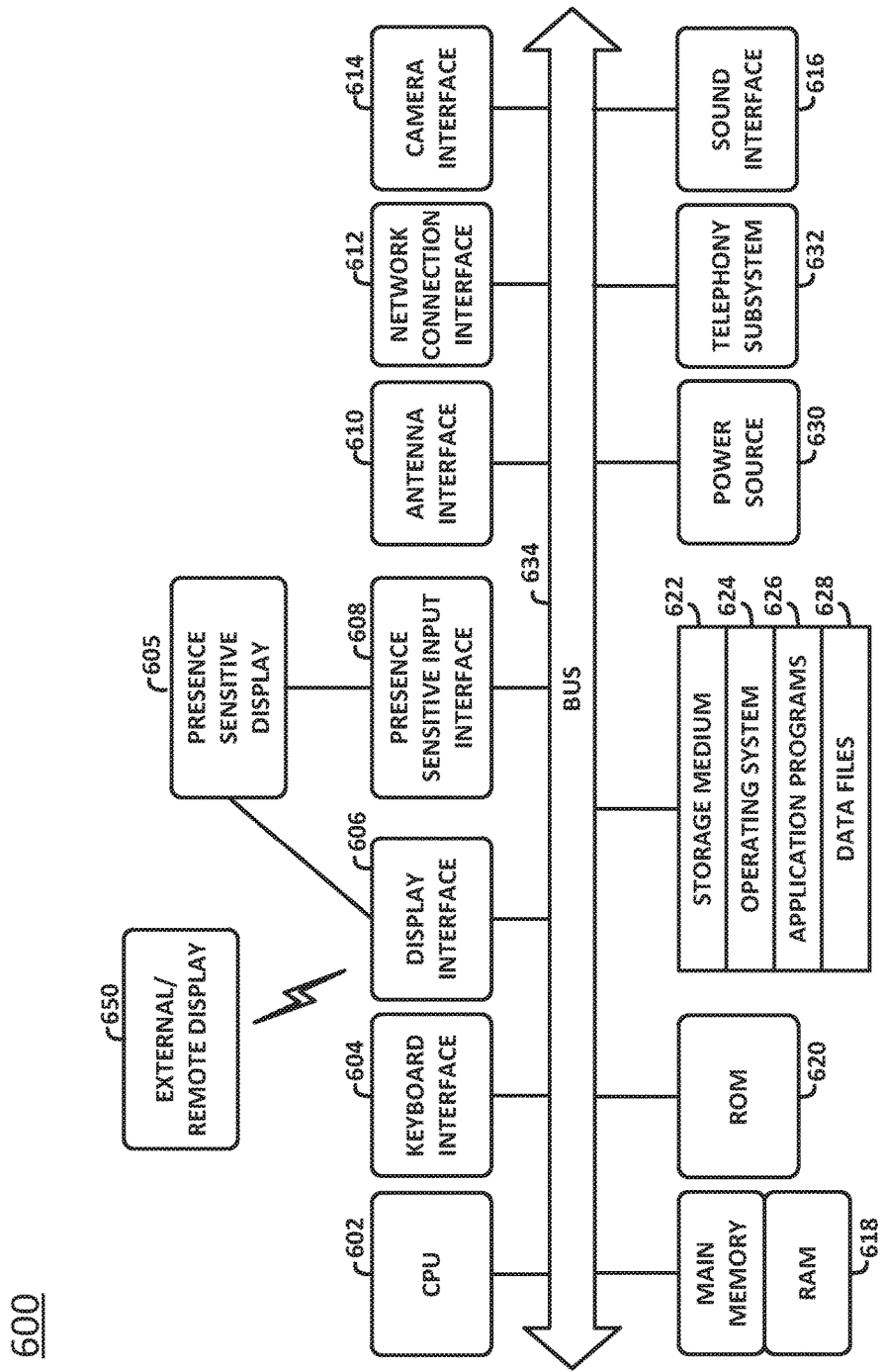
FIG. 6 is a block diagram of a computing device system architecture according to an embodiment.

FIG. 6 depicts a block diagram showing a computer system architecture 600 according to an example embodiment. As desired, embodiments of the disclosed technology can include a mobile computing device, a desktop or a server environment with more or less of the components illustrated in FIG. 6. It will be understood that the computing device architecture 600 is provided for example purposes only and does not limit the scope of the various embodiments of the present disclosed systems, methods, and computer-readable mediums. In some embodiments, one or more of the back-end system 105, upload server 135, matching server 145, internet device 155, and web server 514 may be implemented using the computer system architecture 600.

The computing device architecture 600 of FIG. 6 includes a CPU 602, where computer instructions are processed; a display interface 606 that acts as a communication interface and provides functions for rendering video, graphics, images, and texts on the display. According to certain some embodiments of the disclosed technology, the display interface 606 can be directly connected to a local display, such as a touch-screen display associated with a mobile computing device. In another example embodiment, the display interface 606 can be configured for providing data, images, and other information for an external/remote display that may not necessarily be physically connected to the mobile computing device. For example, a desktop monitor can be used for mirroring graphics and other information that can be presented on a mobile computing device. According to certain some embodiments, the display interface 606 can wirelessly communicate, for example, via a Wi-Fi channel or other available network connection interface 682 to the external/remote display.

In an example embodiment, the network connection interface 682 can be configured as a communication interface and can provide functions for rendering video, graphics, images, text, other information, or any combination thereof on the display. In one example, a communication interface can include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 600 can include a keyboard interface 604 that provides a communication interface to a keyboard. In one example embodiment, the computing device architecture 600 can include a presence-sensitive display interface 607 for connecting to a presence-sensitive display. According to certain embodiments of the disclosed technology, the presence-sensitive display interface 607 can provide a communication interface to various devices such as a pointing device, a touch screen, a depth camera, etc. which may or may not be associated with a display.

The computing device architecture 600 can be configured to use an input device via one or more of input/output interfaces (for example, the keyboard interface 604, the display interface 606, the presence sensitive display interface 607, network connection interface 682, camera interface 614, sound interface 616, etc.) to allow a user to capture information into the computing device architecture 600. The input device can include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device be integrated with the computing device architecture 600 or may be a separate device.

For example, the input device may be an accelerometer, a magnetometer, a digital camera, a microphone, and an optical sensor.

Example embodiments of the computing device architecture 600 may include an antenna interface 680 that provides a communication interface to an antenna; a network connection interface 682 that provides a communication interface to a network. According to certain embodiments, a camera interface 614 is provided that acts as a communication interface and provides functions for capturing digital images from a camera. According to certain embodiments, a sound interface 616 is provided as a communication interface for converting sound into electrical signals using a microphone and for converting electrical signals into sound using a speaker. According to example embodiments, a random access memory (RAM) 618 is provided, where computer instructions and data may be stored in a volatile memory device for processing by the CPU 602.

According to an example embodiment, the computing device architecture 600 includes a read-only memory (ROM) 620 where invariant low-level system code or data for basic system functions such as basic input and output (I/O), startup, or reception of keystrokes from a keyboard are stored in a non-volatile memory device. According to an example embodiment, the computing device architecture 600 includes a storage medium 622 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 624, application programs 626 (including, for example, a web browser application, a widget or gadget engine, scripts, and or other applications, as necessary) and data files 628 are stored. According to an example embodiment, the computing device architecture 600 includes a power source 630 that provides an appropriate alternating current (AC) or direct current (DC) to power components. According to an example embodiment, the computing device architecture 600 includes a telephony subsystem 632 that allows the device 600 to transmit and receive sound over a telephone network. The constituent devices and the CPU 602 communicate with each other over a bus 634.

According to an example embodiment, the CPU 602 has appropriate structure to be a computer processor. In one arrangement, the CPU 602 may include more than one processing unit. The RAM 618 interfaces with the computer bus 634 to provide quick RAM storage to the CPU 602 during the execution of software programs such as the operating system application programs, and device drivers. More specifically, the CPU 602 loads computer-executable process steps from the storage medium 622 or other media into a field of the RAM 618 in order to execute software programs. Data may be stored in the RAM 618, where the data may be accessed by the computer CPU 602 during execution. In one example configuration, the device architecture 600 includes at least 825 MB of RAM, and 256 MB of flash memory.

The storage medium 622 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 622, which may comprise a machine-readable storage medium. Machine-readable storage medium (which may also be referred to herein as "computer storage media", "computer-readable storage medium" or "computer-readable storage media") may include volatile and non-volatile, removable and non-removable media implemented in any method or technology for storage of information, but do not include transitory signals.

According to one example embodiment, the term computing device, as used herein, may be a CPU, or conceptualized as a CPU (for example, the CPU 602 of FIG. 6). In this example embodiment, the computing device may be coupled, connected, and/or in communication with one or more peripheral devices, such as display. In another example embodiment, the term computing device, as used herein, may refer to a mobile computing device, such as a Smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data can be processed by one or more computer processors as desired in various embodiments of the disclosed technology and/or stored in one or more memory devices.

One or more network interfaces can facilitate connection of the computing device inputs and outputs to one or more suitable networks and/or connections; for example, the connections that facilitate communication with any number of sensors associated with the system. The one or more network interfaces can further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems. As desired, embodiments of the present disclosure can include the device computing system architecture with more or less of the components illustrated in FIG. 6.

The specific configurations, choice of materials and the size and shape of various elements can be varied according to particular design specifications or constraints requiring a system or method constructed according to the principles of the present disclosure. Such changes are intended to be embraced within the scope of the present disclosure. The presently disclosed embodiments, therefore, are considered in all respects to be illustrative and not restrictive.

What is claimed is:

1. A computer-implemented method for identifying inventory on a web page, the method comprising:
   uploading, to an upload server, data representing a merchant inventory feed; and
   updating the web page to include script instructions or a reference to a location of the script instructions,
   wherein the web page does not include html designations of inventory,
   wherein the script instructions are configured to, in substantial real time in response to the web page being visited by a user device, instruct the user device to (i) capture data indicative of nodes of the web page that are being rendered within a viewing window on the user device and (ii) cause the captured data indicative of the nodes to be transmitted to a matching server, whereby the script instructions do not require modifications to accommodate changes to at least one of a content and a structure of the web page and can be implemented on numerous website configurations without modification,
   wherein the matching server is configured to compare the captured data indicative of the nodes to stored merchant inventory data to determine matching data indicative of inventory displayed on the web page visited by the user and to output the matching data, the stored merchant inventory data corresponding to the merchant inventory feed,
   wherein the upload server is configured to clean the merchant inventory feed, and
   wherein the script instructions are further configured to, when the web page is visited by the user device, instruct the user device to:
      clean the captured data indicative of the nodes to provide cleaned data using a process similar to the upload server's process for cleaning the merchant inventory feed, the cleaned captured data also being indicative of the nodes, and
      cause the cleaned captured data to be transmitted to the matching server.

2. The method of claim 1, wherein the matching server is further configured to compare the captured data indicative of the nodes to a plurality of fields for each inventory item contained in stored merchant inventory data to determine the matching data.

3. The method of claim 1, wherein the script instructions are configured to instruct the user device to clean the captured data by at least one of:
   removing non-word characters and punctuation from fields of the captured data;
   and standardizing abbreviations and synonyms within the captured data.

4. The method of claim 1, wherein the captured data is substantially limited to nodes that are rendered within a viewing window of the user device.

5. The method of claim 1, wherein the script instructions provide zero-configuration capture and transmission of the web page data.

6. A computer-implemented method of a user device for page-feed recognition (PFR), the method comprising:
   accessing, by a user device, a web page having a PFR script or a reference to a location of the PFR script, wherein the web page does not have html designations of inventory items, whereby the PFR script is configured such that modifications of the PFR script are not required to accommodate changes to a content of the web page and can be implemented on numerous website configurations without modification;
   capturing, in substantial real time in accordance with instructions from the PFR script, data indicative of nodes of the web page being rendered within a viewing window on the user device;
   cleaning, in accordance with instructions from the PFR script, the captured data indicative of the nodes to provide cleaned data using a process similar to the process by which the merchant inventory data was cleaned, the cleaned captured data also being indicative of the nodes; and
   causing, in accordance with instructions from the PFR script, the cleaned captured data indicative of the nodes to be transmitted to a matching server,
   wherein the matching server is configured to compare the cleaned captured data indicative of the nodes to stored clean merchant inventory data to determine matching data indicating inventory displayed on the web page accessed by the user device, and output the matching data.

7. The method of claim 6, wherein the matching server is further configured to compare the captured data indicative of the nodes to a plurality of fields for each inventory item contained in stored merchant inventory data to determine the matching data.

8. A computer-implemented method of a user device for page-feed recognition (PFR), the method comprising:
   accessing, by a user device, a web page having a PFR script or a reference to a location of the PFR script, wherein the web page does not have html designations of inventory items, whereby the PFR script is configured such that modifications of the PFR script are not required to accommodate changes to a structure of the web page and can be implemented on numerous website configurations without modification;
   capturing, in substantial real-time in accordance with instructions from the PFR script, data indicative of nodes of the web page being rendered within a viewing window on the user device;
   cleaning, in accordance with instructions from the PFR script, the captured data indicative of the nodes to provide cleaned captured data, the cleaned captured data also being indicative of the nodes;
   causing, in accordance with instructions from the PFR script, the cleaned captured data indicative of the nodes to be transmitted to a matching server, wherein the matching server is configured to compare the cleaned captured data indicative of the nodes to stored clean merchant inventory data to determine matching data indicating one or more inventory items displayed on the web page accessed by the user device; and
   causing, in accordance with instructions from the PFR script, data indicative of user behavior with respect to the nodes of the web page being rendered within the viewing window, wherein the matching server is further configured to generate a user interest score of the one or more inventory items based on the data indicative of user behavior.

9. The method of claim 8, wherein the data indicative user behavior comprises a notification that a user of the user device has visited the web page.

10. The method of claim 9, wherein the notification comprises an identification associated with the user in associated with an identification of the web page.

11. The method of claim 8, wherein the user behavior comprises at least one of a visiting a web page associated with an individual inventory item, staying on a particular web page for a certain period of time, zooming in on a picture associated with an individual inventory item, highlighting text on the web page, or interacting with website features.

12. The method of claim 8, wherein the matching server is further configured to create user-specific retargeting advertisements based on the user interest score.

\* \* \* \* \*